United States Patent
Miller et al.

(10) Patent No.: US 11,040,417 B2
(45) Date of Patent: Jun. 22, 2021

(54) WELDING GAS COMPOSITIONS AND METHOD FOR USE

(71) Applicants: Philip L. Miller, Corfu, NY (US); Kevin A. Lyttle, Williamsville, NY (US); Jeremy B. Neff, Boston, NY (US); Douglas A. Steyer, Orchard Park, NY (US); Keith G. Pierce, East Amherst, NY (US)

(72) Inventors: Philip L. Miller, Corfu, NY (US); Kevin A. Lyttle, Williamsville, NY (US); Jeremy B. Neff, Boston, NY (US); Douglas A. Steyer, Orchard Park, NY (US); Keith G. Pierce, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 1076 days.

(21) Appl. No.: 14/107,275

(22) Filed: Dec. 16, 2013

(65) Prior Publication Data

US 2015/0165565 A1    Jun. 18, 2015

(51) Int. Cl.
| | |
|---|---|
| *B23K 35/38* | (2006.01) |
| *B23K 9/23* | (2006.01) |
| *B23K 9/173* | (2006.01) |
| *B23K 9/167* | (2006.01) |
| *B23K 103/10* | (2006.01) |

(52) U.S. Cl.
CPC .............. *B23K 35/38* (2013.01); *B23K 9/167* (2013.01); *B23K 9/173* (2013.01); *B23K 9/23* (2013.01); *B23K 35/383* (2013.01); *B23K 2103/10* (2018.08)

(58) Field of Classification Search
CPC ....... B23K 9/173; B23K 35/383; B23K 9/325
USPC .............................. 219/74, 137 WM, 137 PS
See application file for complete search history.

(56) References Cited

U.S. PATENT DOCUMENTS

| | | | |
|---|---|---|---|
| 4,292,493 A | 9/1981 | Selander et al. | |
| 5,210,388 A * | 5/1993 | Farwer | B23K 35/383 |
| | | | 219/137 R |
| 5,210,389 A | 5/1993 | Farwer | |
| 5,488,216 A | 1/1996 | Farwer | |
| 5,558,791 A * | 9/1996 | Fawer | B23K 35/383 |
| | | | 219/137 WM |
| 5,609,783 A | 3/1997 | Fawer | |
| 5,667,702 A | 9/1997 | Soula et al. | |

(Continued)

FOREIGN PATENT DOCUMENTS

| | | |
|---|---|---|
| EP | 0 949 041 A1 | 4/1999 |
| WO | WO 2009/127545 A1 | 10/2009 |

*Primary Examiner* — Tu B Hoang
*Assistant Examiner* — Thomas J Ward
(74) *Attorney, Agent, or Firm* — Ralph J. Mancini

(57) ABSTRACT

The present invention relates generally to welding gas compositions used as shielding gases in an electric arc welding process. More particularly, the invention is directed a shielding gas compositions used in gas metal or tungsten metal arc welding processes for welding aluminum or aluminum alloy containing work pieces. The compositions comprise from 200 to less than 400 ppm oxygen; from 200 to less than 400 ppm of a second gas selected from nitrous oxide, nitrogen, and combinations thereof; and the remainder being an inert gas preferably selected from argon, helium, and mixtures thereof.

12 Claims, 3 Drawing Sheets

(56) References Cited

U.S. PATENT DOCUMENTS

| | | | |
|---|---|---|---|
| 5,667,703 A * | 9/1997 | Soula .................. | B23K 35/383 |
| | | | 219/137 WM |
| 6,303,892 B1 * | 10/2001 | Farwer ................ | B23K 35/383 |
| | | | 219/137 WM |
| 6,392,194 B1 | 5/2002 | Fortain et al. | |
| 6,586,700 B2 * | 7/2003 | Fortain ................ | B23K 9/164 |
| | | | 219/137 PS |
| 6,969,818 B2 | 11/2005 | Miklos | |
| 7,071,438 B2 * | 7/2006 | de Abreu Mac do ... | B23K 9/16 |
| | | | 219/137 WM |
| 7,189,941 B2 * | 3/2007 | Miklos ................. | B23K 9/232 |
| | | | 219/137 R |
| 7,718,914 B2 | 5/2010 | Miklos | |
| 2007/0045237 A1 | 3/2007 | Matz et al. | |

* cited by examiner

| Additive to Argon in ppm | Bead Appearance (1=worst, 5=best) | Wetting (1=worst, 5=best) | Arc Etched Zone Reduction (1=widest, 5=most narrow) | Penetration Area (1=least, 5=most) | Totals | |
|---|---|---|---|---|---|---|
| 200 O2 | 3 | 2 | 3 | 1 | 9 | Gas blends above 600ppm O2 were not included due to heavily contaminated weld beads |
| 400 O2 | 3 | 3 | 3 | 2 | 11 | |
| 600 O2 | 2 | 3 | 4 | 4 | 14 | |
| 200 N2O | 4 | 2 | 2 | 1 | 9 | |
| 400 N2O | 3 | 2 | 3 | 3 | 11 | |
| 600 N2O | 2 | 2 | 4 | 4 | 12 | |
| 800 N2O | 1 | 2 | 4 | 5 | 12 | |
| 1000 N2O | 1 | 2 | 5 | 4 | 12 | |
| 200 N2 | 4 | 2 | 2 | 1 | 9 | |
| 400 N2 | 4 | 2 | 2 | 1 | 9 | |
| 600 N2 | 4 | 2 | 2 | 2 | 10 | |
| 800 N2 | 3 | 1 | 1 | 2 | 7 | |
| 1000 N2 | 3 | 1 | 1 | 1 | 6 | |
| 100 O2 + 100 N2O | 5 | 3 | 1 | 1 | 10 | |
| 200 O2 + 200 N2O | 5 | 3 | 4 | 3 | 14 | |
| 300 O2 + 300 N2O | 4 | 4 | 4 | 3 | 15 | |
| 400 O2 + 400 N2O | 1 | 2 | 5 | 4 | 12 | |
| 500 O2 + 500 N2O | 1 | 1 | 5 | 5 | 12 | |
| 100 O2 + 100 N2 | 5 | 3 | 3 | 1 | 12 | |
| 200 O2 + 200 N2 | 4 | 3 | 3 | 3 | 13 | |
| 300 O2 + 300 N2 | 4 | 3 | 4 | 4 | 15 | |
| 400 O2 + 400 N2 | 2 | 4 | 4 | 5 | 15 | |
| 500 O2 + 500 N2 | 1 | 2 | 4 | 5 | 12 | |

Fig. 1

WELDING GAS COMPOSITIONS AND METHOD FOR USE

FIELD OF THE INVENTION

The present invention relates generally to welding gas compositions used as shielding gases for electric arc welding processes and the method of use of such gases in arc welding processes. More particularly, this invention relates to shielding gas compositions comprising small amounts of oxygen and nitrous oxide and/or nitrogen in an inert gas such as argon or an argon/helium mixture for improving the welding characteristics obtained when welding aluminum or aluminum alloy containing work pieces with such processes.

BACKGROUND OF THE INVENTION

Electric arc welding processes are well known and gas metal arc welding (GMAW) and gas tungsten metal arc welding (GTAW) are common electric arc welding processes for joining metal work pieces in various production environments. GMAW is the most common industrial welding process used today as it is preferred for its versatility, speed, and the relative ease of adaptation to robotic automation. It is particularly useful in continuous wire feed processes including assembly line processes employing automated or robotic welders and can be used for a wide variety of materials. GMAW, sometimes referred to its subtypes as metal inert gas (MIG) welding or metal active gas (MAG) welding, forms an electric arc between a consumable wire electrode and the workpiece metal(s) causing the workpiece metal(s) to melt and join. GTAW processes are typically associated with manual welding processes and are especially useful for welding thin materials such as light metals and stainless steel or when high quality welds are required. GTAW, also known as tungsten inert gas (TIG) welding, uses a non-consumable tungsten electrode and a separate filler material to create the weld.

Electric arc welding processes use shielding gases to provide a barrier or "shield" in the vicinity of the weld or weld pool. Air in the weld zone is displaced by a shielding gas in order to prevent contamination of the molten weld puddle. This contamination is caused mainly by nitrogen, oxygen and water vapor present in the atmosphere. Such shielding gases are typically inert or semi-inert and are used to protect the weld pool from the atmospheric gases which can react with the weld metal(s) to form undesirable species that adversely affect the weld. Certain of these species have been shown to introduce defects into the weld itself thereby reducing the quality of the weld and often make the welding process more difficult. For example, the absence of effective shielding gases can lead to porous and weak welds or to excessive spatter; the latter, while not affecting the weld itself, causes loss of productivity due to the reduction in welding efficiency and increased labor needed to remove the scattered droplets.

Shielding gases are chosen for their performance with the particular materials or work pieces to be welded and the particular welding process employed. More specifically, they are selected for their properties including their shielding ability; their thermal conductivity and heat transfer properties; their density relative to air; and their ability to easily undergo ionization. Heat transfer is important for rapidly heating the work piece and it is desirable to have stable arcs to improve the effectiveness and appearance of the weld. Speed of ionization influences how easy the arc starts and the required voltage level for maintaining stable arcs. Effective shielding gases greatly improve the quality and appearance of the weld as well as the overall productivity of the process.

In the welding of aluminum or aluminum alloy work pieces, the shielding gases traditionally used are inert such as pure argon, pure helium or argon/helium blends. Argon is preferred because, in addition to being inert and not reacting with the molten weld puddle, it has a low ionization potential. Gases with lower ionization potential take less energy to create and maintain the arc and are more stable. Helium and helium blends have high thermal conductivity and helium blends are typically used on thicker material to transferred heat more effectively to the base material.

More recently, very small additions of "active" gases such as oxygen, hydrogen, carbon dioxide, nitrous oxide, and nitrogen have been proposed for use with inert gases for welding various metals and for various reasons. Some of the benefits suggested for using these additives include increased travel speeds, increased or enhanced penetration, and decreased surface tension which provide better wetting, increased fluidity of the molten metal and better arc stability. The drawbacks of using active gases are that they are, or become, reactive resulting in excessive oxidation in the weld and work piece, especially with aluminum, and the formation of the previously described undesirable species or compounds. Moreover, even typically unreactive or less reactive gases such as nitrogen and carbon dioxide can break down and react with the molten metal(s) and/or metal vapor(s) or recombine to form these undesirable compounds or species at the high temperatures found in or near the arc.

The addition of nitrogen, oxygen, and nitrous oxide to both argon and argon and helium mixes has been proposed for use with GMAW and GTAW type processes. For example, U.S. Pat. Nos. 4,292,493; 5,210,388; 5,210,389; 5,558,791, 5,609,793; 5,667,703; 6,303,892, 6,392,194; 6,586,700, 6,969,818; and 7,071,438 suggest various additions of active gases to argon, helium or mixes shielding gases. However, there are no teachings and no examples showing the use of very low levels of oxygen and nitrous oxide and/or nitrogen in combination to provide unexpected and superior performance in arc welding processes, and particularly in GMAW and GTAW processes for welding at least one aluminum or aluminum alloy workpiece to a second work piece.

According to this invention, improved welding gas compositions are provided for use as shielding gases in electric arc welding processes. The present shielding gas compositions have been found to improve both qualitative and quantitative weld characteristics when welding an aluminum or aluminum alloy containing work piece to a second work piece, preferably in a GTAW or GMAW process. The use of the present shielding gas compositions containing oxygen and nitrous oxide and/or nitrogen at the claimed levels have been found to provide the surprising combination of good bead weld appearance, improved wetting, enhanced weld penetration, and reduced arc etch zone. The use of the two-active gas composition provides superior results as compared to the use of either active alone.

BRIEF SUMMARY OF THE INVENTION

The present invention provides a shielding gas comprised of combinations of active gas additives to argon, helium or argon/helium mixtures to shield welding processes to improve the overall welding performance when welding one or more aluminum or aluminum alloy work pieces. The welding performance is improved by proving good bead weld appearance, improved wetting, improved weld penetration, and a reduced arc etch zone (arc cleaned zone) on either side of the weld. The shielding gas has a composition comprises from 200 to less than 400 ppm oxygen, from 200 to less than 400 ppm of a gas selected from nitrous oxide, nitrogen or a combination thereof, and the balance being an inert gas, preferably selected from argon and argon/helium mixes.

Accordingly, in one embodiment of this invention, a welding gas composition is provided for use as a shielding gas in an electric arc welding process comprising:
from 200 to less than 400 ppm oxygen;
from 200 to less than 400 ppm of nitrous oxide, nitrogen or a combination thereof; and
the remaining balance being an inert gas In another embodiment, a method is provided for gas metal or tungsten metal electric arc welding one or more aluminum or aluminum alloy containing work pieces, wherein the method comprises welding the work pieces under electric arc welding conditions in the presence of a shielding gas composition:
from 200 to less than 400 ppm oxygen;
from 200 to less than 400 ppm of a second gas selected from nitrous oxide, nitrogen or a combination thereof; and
the remaining balance being an inert gas.

In yet another embodiment, a method is provided for an improved shielding gas process comprising delivering a premixed gas mixture to an automated electric arc welding process in substantial condition to be connected directly to the welding process and delivering the shielding gas to the welding process to weld at least one aluminum or aluminum alloy work piece to a second work piece wherein the premixed gas mixture the composition comprising:
from 200 to less than 400 ppm oxygen;
from 200 to less than 400 ppm of a second gas selected from nitrous oxide, nitrogen or a combination thereof; and
the remaining balance being an inert gas.

BRIEF DESCRIPTION OF THE DRAWINGS

FIG. 1 is a table showing a comparison of four welding characteristics using various shielding gas blends in a GTAW process.

DETAILED DESCRIPTION OF THE INVENTION

Figure 2:
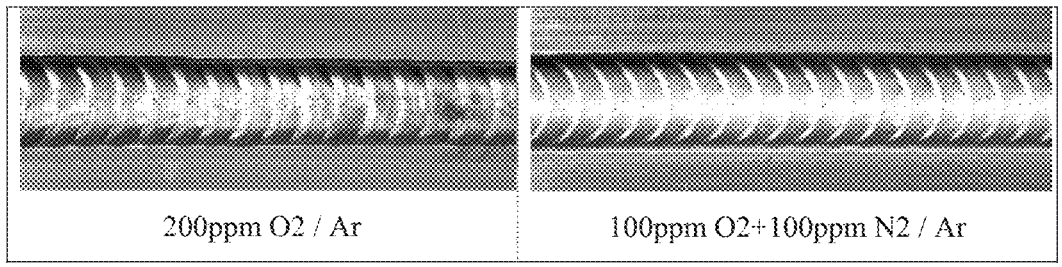
FIGS. 2 to 5 are photographs of bead on plate welds completed with the GTAW process.

This invention is directed to novel welding gas compositions used as shielding gases. These shielding gases are used preferably in gas metal arc welding (GMAW) and gas tungsten metal arc welding (GTAW) processes when welding one or more aluminum or aluminum alloy containing work pieces. Also described and claimed is a welding method for using the novel shielding gas compositions. As used herein, all percentages and parts for the gas concentrations are by volume unless otherwise indicated.

Electric arc welding is a well known fabrication process that joins materials, such as various metal work pieces through a melting or coalescence process using an electric arc between the electrode and work piece as the energy source. The present invention is directed to welding aluminum and aluminum alloy containing work pieces using known arc welding processes. In a preferred embodiment, two aluminum or aluminum alloy work pieces are welded using a GTAW process in the presence of the present shielding gas composition. GMAW and GTAW processes are well known as is the use of shielding gases to improve these types of arc welding processes. Shielding gases protect the weld pool area from atmospheric gases and provide a common method of controlling the factors that can diminish the weld quality and appearance. Defects in the weld can result from the reaction of the weld metal with active gases, such as oxygen, nitrogen or water vapor as typically found in atmospheric gases. These defects adversely affect the strength and/or appearance of the weld. Examples of welding defects include cracks, distortions, gas inclusions (porosity), non-metallic inclusions, reduced or limited fusion, incomplete penetration, lamellar tearing and undercutting.

The present invention provides improved shielding gas compositions that provide a good bead weld appearance, improved wetting, improved weld penetration, and a reduced arc etch zone as compared to conventional shielding gases comprised of inert gases without active gas additives or compositions with only one active gas additive. As further discussed below, current shielding gases do not provide good results for all of these characteristics collectively when used to shield arc welding aluminum or aluminum alloy containing work pieces.

The compositions of this invention are used as shielding gases for welding aluminum or aluminum alloy containing work pieces. At least one of the work pieces to be welded, and preferably both, will be selected from industrial grade pure aluminum or aluminum alloy containing pieces. Preferably the work pieces will be made of aluminum or an aluminum alloy, and more preferably will be made of aluminum. The aluminum alloys include wrought non-heat-treatable alloys, wrought heat treatable alloys, and casting alloys. Examples of such aluminum alloys include the series of alloys derived from aluminum-silicon, aluminum-magnesium, and aluminum-lithium alloys. Additional aluminum alloy series include, but are not limited to, alloys based on compositions of Al—Cu, Al—Cu—Mg, Al—Mg—Si, Al—Zn—Mg and Al—Zn—Mg—Cu. The meltable wire used as the consumable electrode and/or filler metal includes but is not limited to the 4xxx or 5xxx series of aluminum metals.

When welding aluminum or aluminum alloy containing work pieces in a GMAW or GTAW type process, the oxide layer (e.g. Al2O3) must be removed to obtain proper wetting of the molten metal. With the GTAW process, an AC current is typically used to take advantage of the characteristics of the arc. Energy to melt the base material occurs during the electrode negative (EN) portion of the current while oxide removal (cleaning) occurs during the electrode positive (EP) portion of the current. This is also known as cathodic cleaning.

Moreover, cathode attachment spots (sometimes referred to as mobile cathode spots) are locations where the arc attaches to the base material during the EP portion of the current. These spots can be visualized using high speed videography with appropriate fillers and recent studies have shown that various aluminum oxides, such as $Al_2O_3$, provide good conditions for arc attachment at the edge of the oxide layers or sections. The arc changes its attachment points very rapidly along the edges of the sections, cracking the oxide layer like a sandblasting process and cleaning the surface. During the cleaning cycle, the oxides are depleted in the area directly under the electrode and surrounding the weld puddle and the arc widens to preferential attachment points where oxides are still available. The GMAW process (including GMAW-Pulse) typically employs a DCEP current, so this cleaning action occurs continuously due to the direction of the flow of current. The cleaning action leaves a distressed area or cleaning zone around the weld (e.g. on both sides of the weld bead). This area, identified herein as the "arc-etched zone" appears as though it has been sandblasted leaving a discolored and smoothed area around the weld bead. In applications where the cosmetic aspect of the weld is important, minimizing the size, generally the width, of these cleaning zones is desired for a more pleasing appearance.

In addition to reducing the arc etched zone, two other key weld characteristics are addressed by the present shielding gases which also lead to more attractive welds as well as high quality welds. These characteristics include wetting and penetration. Wetting as used herein describes the degree of surface tension as well as the degree of fluidity of the weld pool. Fluidity of the molten weld pool is important for several reasons. Fluid puddles or pools tend to wet out smoothly at the edges and produce a flat, smooth bead shape. This is important on multi-pass welds where lack-of-fusion defects can occur if bead shape is poor. Flat, well-wet-in beads are desirable where appearance is a primary concern and where post weld grinding is required. In a typical GMAW process, the decrease in surface tension can promote a decrease in droplet size in the arc column. Smaller droplet size also leads to higher metal transfer rates and a faster welding process. Weld penetration as used herein describes the distance that the fusion line extends below the surface of the material being welded. Weld beads that appear like they are on top of the parent metal will have limited penetration and will not normally have exhibited a good wet out.

It has been found that gaseous compounds containing oxygen dissociate into atomic oxygen (O+) as they are heated in the arc. Atomic oxygen is strongly active (e.g. it will react exothermically with elements in the base material and/or filler metal), raises the temperature of the plasma and results in metal oxides that cover the droplets and the weld pool. These oxides will have less surface tension than the pure metal and smaller droplets are formed which are detached more frequently and transferred more regularly. Thus a combination of higher temperature and reduced surface tension leads to higher melting rates and faster welding speeds. However, shielding gas compositions containing oxygen in inert gases at concentrations of greater than about 400 ppm and used with aluminum or aluminum alloy work pieces in the GTAW process have been found to result in a heavily oxidized surface making the weld appearance unacceptable. This oxidation may also result in adverse characteristics or defects in the weld strength.

It has unexpectedly been found that the use of the inventive shielding gas compositions, containing the claimed combination of active gases and at the claimed concentrations in inert gases, provides a superior combination of welds characteristics not before known or disclosed. More specifically, the welding performance is improved by achieving good bead weld appearance, improved wetting, improved weld penetration, and a reduced arc etch zone as illustrated below. According to this invention, the inventive shielding gas compositions are comprised of very small amounts of oxygen and nitric oxide and/or nitrogen additives, the active gases, in one or more inert carrier gases. The inert gas can be any inert gas or blends of gases but is preferably selected from the group argon, helium, and combinations thereof. A preferred inert gas is a blend of argon and helium with up to 50% helium.

The active gas components are a combination of a first gas of oxygen ($O_2$) and a second gas selected from nitric oxide ($N_2O$), nitrogen ($N_2$), and combinations thereof in amounts from about 200 to less than about 400 ppm. Concentrations of the active gases above or below this range have been found to provide unsatisfactory results when measure for all four of the desired characteristics as shown below. However, it should be understood that the addition of such small amounts of active gases in the gas compositions of this invention are difficult to control precisely when mixed in industrial processes and that a variation in the concentrations of the active gases of up to about 5% can be expected in commercial use.

The preferred shielding gas compositions comprise 200-350 ppm $O_2$ and 200-350 ppm $N_2O$, $N_2$, or a combination thereof with the remaining balance being one or more inert gases. More preferred shielding gas compositions are comprised of about 200 ppm $O_2$ and 200 ppm $N_2O$, $N_2$, or a combination thereof and 200 ppm $O_2$ and 275 ppm $N_2O$, $N_2$, or a combination thereof; each in an inert gas containing a combination of argon and helium. The superior characteristics of the present shielding gas compositions when used in arc welding processes on aluminum work pieces are described and illustrated below.

The shielding gas compositions are used in the welding process using conventional methods and can be provided to the welding process in premixed cylinders or other containers or as individual components that are mixed at the welding tool. It is preferred to deliver a premixed shielding gas mixture to an automated electric arc welding process in substantial condition to be connected directly to the welding process. Connections, valves, and others attachment systems are known and the inventive compositions can be used with existing systems equipment, and tools.

The improved characteristics of the present shielding gas compositions can be seen from the following examples which compare the appearance, wetting, penetration and arc etched zone of the weld using comparative examples showing blends outside the scope of the present invention. Many of the compositions demonstrated good results for one or more characteristics, but only the claimed compositions demonstrated good or better results for all characteristics measured.

Bead on plate coupon was welded using the GTAW process. The work piece was a 6061 aluminum base metal strip that was 2 inches (50.8 mm) wide, 8 inches (203.2 mm) long, and 0.25 inches (6.35 mm) thick. The weld was completed using a Fronius MW4000 machine using AC GTAW with 1/16 inch diameter 4043 filler metal, 210 Amps, and 8.5 IPM travel speed. Arc balance was set at −1.5. The torch was mounted to a Pandiris model PBT-96 side-beam to ensure accurate and repeatable parameters. The work piece was mounted in a permanent fixture below the torch. The tungsten electrode to work piece distance was maintained at 0.125 inch (3.18 mm).

This procedure was repeated for each example with only the shielding gas composition being modified. FIG. 1 is a table reporting the results for 23 examples. Four welding characteristics were measured and rated from 1 (worst) to 5 (best) for each example tested. Each line in FIG. 1 shows results for welds made with one shielding gas blend containing either one or two active gas additions to argon. The gas blends were selected to represent the range of active gas concentrations where benefits were expected.

The weld samples were removed from the same location for each example on the weld coupon, cut, polished, etched and measured with the NAMeS™ weld measuring software.

Photographs were taken of each coupon before removing the sample for cutting and etching and are shown in FIGS. 2-6 as discussed below.

The bead appearance was qualitatively measure by reviewing the aesthetics of the weld. A "1" rating indicated that the surface of the weld face had excessive contamination in the form of black spots or blackened areas and very dull dark gray color with a rough weld face. This level of contamination indicates heavily oxidized material that cannot be removed by wiping or wire brushing. A "5" rating indicated almost no contamination on the weld surface with a shiny smooth texture requiring no post weld cleaning. Wetting was determined by comparing the width of the bead and appearance of the surface texture. Welds exhibiting higher surface tension generally show more pronounced or jagged ripples on the weld face (rougher) and are less uniform. In addition welds with higher surface tension do not wet out as well and have a sharper transition between the weld toes and base material. The arc etched zone was measured on each side of the weld bead by importing photographs of the weld into NAMeS™ weld measuring software and taking measurements. Using a spreadsheet, measurement data was sorted and categorized into groups or "bins" and assigned a rating of 1 to 5. The bin size was found by dividing the data range into 5 evenly sized bins. The widest measurements were assigned a "1" rating and the most narrow measurements a "5" rating. The data range and bin sizes are shown in table 1. The samples were considered good if they fell into the bin "3" range, while bin (rating) "4" was considered better and bin (rating) "5" best.

TABLE 1

Arc Etched Bin Size

| | |
|---|---|
| Data Range (inch) | 0.0190 to 0.1175 |
| bin size | 0.0197 |
| bin 1 | 0.0979 to 0.1175 |
| bin 2 | 0.0782 to 0.0978 |
| bin 3 | 0.0585 to 0.0781 |
| bin 4 | 0.0388 to 0.0584 |
| bin 5 | 0.0190 to 0.0387 |

The weld penetration area was measured by importing photographs of the cut and etched cross sections into NAMeS™ weld measuring software and taking area measurements. The larger the area measured, the better the penetration. Using a spreadsheet, measurement data was sorted and categorized into groups or "bins" and assigned a rating of 1 to 5. The bin size was found by dividing the data range into 5 evenly sized bins. The smallest area measurements were assigned a "1" rating and the largest a "5" rating. The data range and bin sizes are shown in Table 2. The samples were considered good if they fell into the bin "3" range, while bin "4" was considered better and bin "5" best.

TABLE 2

Weld Penetration Area Bin Size

| | |
|---|---|
| Data Range (sq. inch) | 0.0345 to 0.056 |
| bin size | 0.0043 |
| bin 1 | 0.0345 to 0.0387 |
| bin 2 | 0.0388 to 0.0430 |
| bin 3 | 0.0431 to 0.0473 |
| bin 4 | 0.0474 to 0.0516 |
| bin 5 | 0.0517 to 0.0560 |

FIG. 2 is two photographs comparing the bead appearance of two weld samples as labeled. One weld sample was welded with a shielding gas containing only 1 active gas ($O_2$) while the other sample was welded with a shielding gas containing two active gases ($O_2+N_2$) at the same total concentration. As shown, the weld made with 100 ppm $O_2$+100 ppm $N_2$/Ar as shielding gas (rated 5) has a much better appearance than the weld made with only 200 ppm $O_2$/Ar (rated 3).

Figure 3:
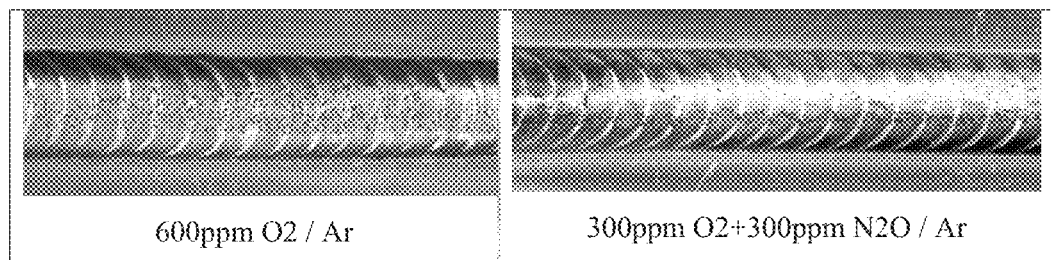

FIG. 3 includes photographs comparing the bead appearance of two weld samples as labeled. One weld sample was welded with a shielding gas containing only 1 active gas ($O_2$) while the other sample was welded with a shielding gas containing two active gases ($O_2+N_2O$) at the same total concentration. As shown, the weld made with the 300 ppm $O_2$+300 ppm $N_2O$/Ar shielding gas (rated 4) has a better appearance than the weld made with 600 ppm $O_2$/Ar (rated 2).

Figure 4:
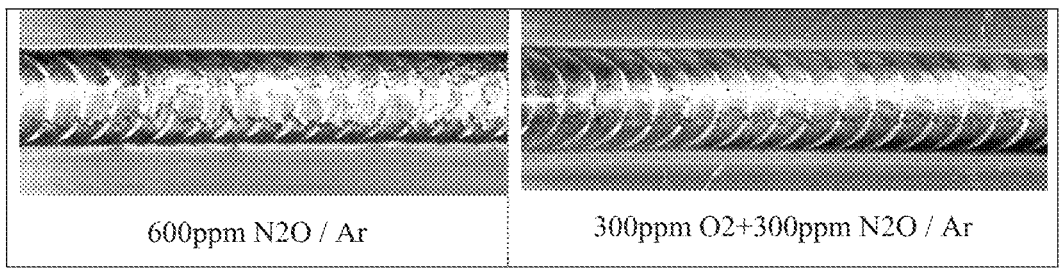

FIG. 4 includes photographs comparing the wetting characteristics of two weld samples as labeled. One weld sample was welded with shielding gas containing only 1 active gas (N2O) while the other sample was welded with a shielding gas containing two active gases (O2+N2O) at the same total concentration. As shown, the weld made with the 300 ppm O2+300 ppm N2O/Ar containing shielding gas shows better wetting (rated 4) than the weld made with 600 ppm N2O/Ar (rated 2).

Figure 5:
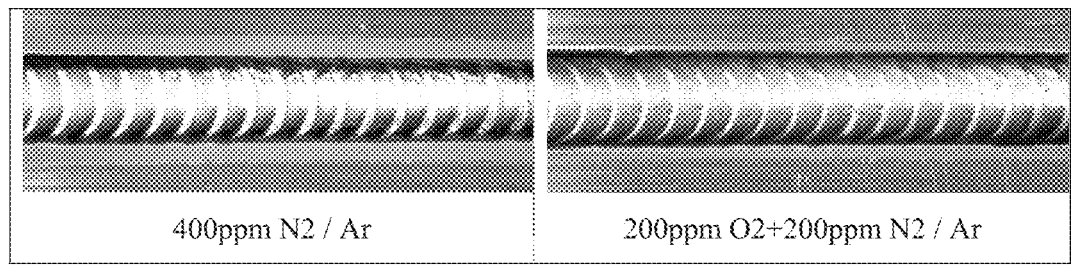

FIG. 5 includes photographs comparing the arc etched zone for two weld samples as labeled. One weld sample was welded with a shielding gas containing only 1 active gas ($N_2$) while the other sample was welded with a shielding gas containing two active gases ($O_2+N_2$) at the same total concentration. As shown, the weld made with the 200 ppm O2+200 ppm N2/Ar containing shielding gas has a smaller arc-etched size (rated 3) than the weld made with 400 ppm $N_2$/Ar containing shielding gas (rated 2).

Figure 6:
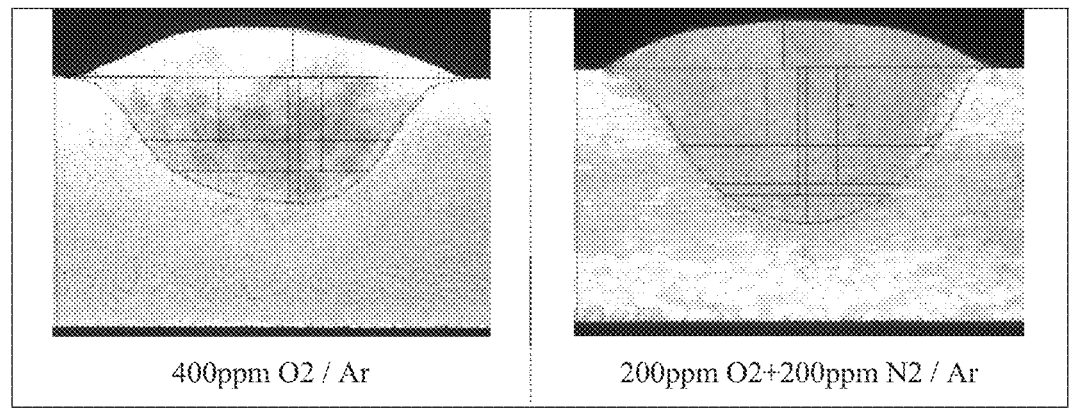
FIG. 6 shows photographic images of cross sections of bead on plate welds after they were cut, polished and etched.

FIG. 6 includes photographs comparing the weld penetration in two weld samples as labeled. One weld sample was welded with a shielding gas containing only 1 active gas (O2) while the other sample was welded with a shielding gas containing two active gases (O2+N2) at the same total concentration. As shown, the weld made with the 200 ppm O2+200 ppm N2/Ar containing shielding gas has greater depth penetration (rated 3) than the weld made with 400 ppm O2/Ar containing shielding gas (rated 2).

The photographs in FIGS. 2-6 illustrate the superior characteristics of the inventive shielding gas compositions containing two selected active gases compared to the use of only one of the active gases at the same total concentration. These Figures in combination with FIG. 1 illustrate the superior results obtained for multiple weld characteristics with the shielding compositions of this invention.

It should be apparent to those skilled in the art that the subject invention is not limited by the examples provided herein which have been provided to demonstrate the operability and illustrate the improvements associated with the present invention. The scope of this invention includes equivalent embodiments, modifications, and variations that fall within the scope of the attached claims.

What is claimed is:

1. A method for gas metal or tungsten metal electric arc welding of aluminum containing workpieces comprising:
   providing a shielding gas composition to a gas metal or tungsten metal electric arc welding process, said shielding gas composition consisting essentially of:
   a first active gas comprising oxygen, said first active gas concentration from 200 to less than 400 ppm oxygen;

a second active gas comprising a second active gas concentration from 200 to less than 400 ppm said second gas selected from the
group consisting of: nitrous oxide, nitrogen and or a combinations thereof; and
the remaining balance being an inert gas;
wherein said aluminum-containing workpieces are selected from the group consisting of: aluminum, an aluminum alloy and combinations thereof.

2. The method of claim 1 wherein the work piece is made of aluminum.

3. The method of claim 1 wherein:
the first active gas comprises an oxygen concentration of 200 to 350 ppm, and the second active gas comprises 200 to 350 ppm.

4. The method of claim 1 wherein the arc welding process is a gas tungsten arc welding process for welding one or more aluminum work pieces.

5. The method of claim 3 wherein:
the first active gas comprises 200 ppm; and
the second active gas comprises 275 ppm.

6. A method of providing an improved shielding gas to a welding process for joining two or more aluminum containing workpieces comprising delivering a premixed gas mixture in a container to an automated electric arc welding process in substantial condition to be connected directly to the welding process and
delivering the shielding gas to the welding process to weld aluminum or aluminum alloy work pieces wherein the premixed gas mixture has the composition comprising:
a first active gas comprising oxygen in a concentration from 200 to less than 400 ppm;
a second active gas comprising from 200 to less than 400 ppm of a second gas selected from the group consisting of nitrous oxide, nitrogen or a combination thereof; and
the remaining balance being an inert gas selected from a blend of argon and helium with up to 50% helium.

7. The method of claim 6 wherein:
the first active gas comprises 200 to 350 ppm oxygen and the second active gas comprises 200 to 350 ppm nitrous oxide or nitrogen.

8. The method of claim 7 wherein the second active gas is nitrogen.

9. The method of claim 7 wherein the second active gas is nitrous oxide.

10. A method for gas metal or gas tungsten arc welding process for welding aluminum and aluminum alloy work pieces comprising:
providing a shielding gas composition to a gas metal or gas tungsten arc, the shielding gas composition consisting essentially of:
a first active gas comprising oxygen in a concentration from 200 to less than 400 ppm;
a second active gas comprising a second gas in a concentration of from 200 to less than 400 ppm selected from the group consisting of nitrous oxide, nitrogen or a combination thereof; and
the remaining balance being an inert gas with up to 50% helium; and
welding the aluminum and aluminum alloy work pieces together to obtain a weld face having no heavily oxidized material that cannot be removed by wiping or wire brushing.

11. The method of claim 10 wherein the weld requires no post weld cleaning.

12. The method of claim 10 wherein the inert gas is selected from argon or helium.

\* \* \* \* \*